(12) United States Patent
Franzi et al.

(10) Patent No.: US 11,892,808 B2
(45) Date of Patent: Feb. 6, 2024

(54) METHOD FOR MANAGING THE ELECTRICAL CONSUMPTION OF A WATCH

(71) Applicant: Tissot SA, Le Locle (CH)

(72) Inventors: Edoardo Franzi, Cheseaux-Noreaz (CH); Alain-Serge Porret, Neuchatel (CH)

(73) Assignee: Tissot SA, Le Locle (CH)

( * ) Notice: Subject to any disclaimer, the term of this patent is extended or adjusted under 35 U.S.C. 154(b) by 719 days.

(21) Appl. No.: 16/597,184

(22) Filed: Oct. 9, 2019

(65) Prior Publication Data

US 2020/0142361 A1    May 7, 2020

(30) Foreign Application Priority Data

Nov. 2, 2018 (EP) .................................... 18204123

(51) Int. Cl.
*G04G 19/00* (2006.01)
*H02J 7/00* (2006.01)
*G04G 9/00* (2006.01)

(52) U.S. Cl.
CPC ............ *G04G 19/00* (2013.01); *H02J 7/0068* (2013.01); *G04G 9/007* (2013.01)

(58) Field of Classification Search
CPC ........ G04G 19/00; G04G 9/007; G04G 19/02; G04G 19/12; G04G 19/06; H02J 7/0068; G04C 10/00
See application file for complete search history.

(56) References Cited

U.S. PATENT DOCUMENTS

| 6,563,766 | B1 * | 5/2003 | Nakamiya | G04C 10/04 368/64 |
| 6,628,572 | B1 * | 9/2003 | Yabe | H02J 7/0024 368/204 |
| 6,816,439 | B1 * | 11/2004 | Kawahara | G04G 19/08 368/64 |
| 7,729,207 | B2 * | 6/2010 | Kawaguchi | G04C 10/04 368/64 |

(Continued)

FOREIGN PATENT DOCUMENTS

| CN | 2363304 Y | 2/2000 |
| CN | 2786666 Y | 6/2006 |

(Continued)

OTHER PUBLICATIONS

Combined Chinese Office Action and Search Report dated Jan. 25, 2021 in Patent Application No. 201911015614.6 (with English language translation and English translation of Category of Cited Documents), 14 pages.

(Continued)

*Primary Examiner* — Daniel Kessie
*Assistant Examiner* — Brian K Baxter
(74) *Attorney, Agent, or Firm* — Oblon, McClelland, Maier & Neustadt, L.L.P.

(57) ABSTRACT

A method for managing the electrical consumption of a watch including a step of identifying a need to charge an accumulator of the watch, and a step of charging the accumulator through guided actuation of a control member of an electrical energy generation mechanism of the watch, if a need to charge is identified.

16 Claims, 1 Drawing Sheet

(56) References Cited

U.S. PATENT DOCUMENTS

| | | | | |
|---|---|---|---|---|
| RE41,686 E * | 9/2010 | Fujita | | G04C 10/00 |
| | | | | 368/80 |
| 8,380,999 B1 * | 2/2013 | Robison | | G06F 1/08 |
| | | | | 320/120 |
| 9,036,455 B2 * | 5/2015 | Kato | | G04G 19/06 |
| | | | | 368/64 |
| 9,058,128 B1 * | 6/2015 | Robison | | G06F 1/08 |
| 10,663,925 B2 * | 5/2020 | Abramov | | G04G 19/12 |
| 10,936,071 B2 * | 3/2021 | Pandya | | G04C 3/14 |
| | | | | 368/80 |
| 11,513,675 B2 * | 11/2022 | Zambetti | | B60B 11/10 |
| 2003/0137274 A1 * | 7/2003 | Sastry | | H02J 7/32 |
| | | | | 320/101 |
| 2004/0100870 A1 * | 5/2004 | Igarashi | | G04G 19/12 |
| | | | | 368/66 |
| 2004/0119693 A1 * | 6/2004 | Kaemmler | | G06F 1/266 |
| | | | | 345/163 |
| 2006/0098427 A1 * | 5/2006 | Yeh | | F21L 13/08 |
| | | | | 362/183 |
| 2007/0102928 A1 * | 5/2007 | Yang | | H02K 7/1853 |
| | | | | 290/1 C |
| 2007/0223318 A1 * | 9/2007 | Nobs | | G04B 45/02 |
| | | | | 368/204 |
| 2008/0084792 A1 * | 4/2008 | Hayashi | | G04C 3/14 |
| | | | | 368/80 |
| 2008/0225647 A1 * | 9/2008 | Kawaguchi | | G04C 10/04 |
| | | | | 368/204 |
| 2008/0225648 A1 * | 9/2008 | Kawaguchi | | G04C 10/04 |
| | | | | 368/66 |
| 2008/0246437 A1 * | 10/2008 | Kitahara | | G04C 10/04 |
| | | | | 368/204 |
| 2009/0274013 A1 * | 11/2009 | Yang | | B60L 8/003 |
| | | | | 368/204 |
| 2010/0027249 A1 * | 2/2010 | Connor | | F21V 33/0076 |
| | | | | 362/183 |
| 2010/0039903 A1 * | 2/2010 | Yang | | G04C 1/06 |
| | | | | 368/149 |
| 2011/0141859 A1 * | 6/2011 | Papi | | G04B 27/086 |
| | | | | 368/190 |
| 2011/0224511 A1 * | 9/2011 | Saynajakangas | | G16H 40/67 |
| | | | | 600/301 |
| 2012/0254634 A1 * | 10/2012 | Chakra | | G06F 1/28 |
| | | | | 713/300 |
| 2013/0167731 A1 * | 7/2013 | Eidenbenz | | A47J 31/20 |
| | | | | 99/283 |
| 2013/0191662 A1 * | 7/2013 | Ingrassia, Jr. | | G06F 1/3206 |
| | | | | 713/320 |
| 2013/0194897 A1 * | 8/2013 | Kato | | G04B 99/00 |
| | | | | 368/66 |
| 2014/0276262 A1 * | 9/2014 | Kare | | A61H 1/024 |
| | | | | 601/34 |
| 2014/0330764 A1 * | 11/2014 | Rhines | | H04W 52/0261 |
| | | | | 706/46 |
| 2015/0068069 A1 * | 3/2015 | Tran | | A43B 3/34 |
| | | | | 340/693.1 |
| 2015/0137733 A1 * | 5/2015 | Si | | H02J 7/0042 |
| | | | | 320/101 |
| 2015/0323974 A1 * | 11/2015 | Shuster | | G08B 21/182 |
| | | | | 713/320 |
| 2016/0020671 A1 * | 1/2016 | Rastegar | | H02K 7/1853 |
| | | | | 290/1 E |
| 2016/0252883 A1 * | 9/2016 | Inoue | | G04G 21/025 |
| | | | | 368/11 |
| 2017/0075316 A1 * | 3/2017 | Berdinis | | G06F 1/163 |
| 2017/0170677 A1 * | 6/2017 | Park | | G06F 1/1635 |
| 2017/0235380 A1 * | 8/2017 | Sendai | | G06F 1/1635 |
| 2017/0289914 A1 * | 10/2017 | Brown | | H04W 52/0264 |
| 2017/0353043 A1 * | 12/2017 | Olah | | H02J 50/001 |
| 2017/0364038 A1 * | 12/2017 | Fulda | | G04C 10/00 |
| 2018/0035383 A1 * | 2/2018 | Cavallaro | | H04W 68/005 |
| 2018/0039232 A1 * | 2/2018 | Abramov | | G04G 19/12 |
| 2018/0078181 A1 * | 3/2018 | Cronin | | G16Z 99/00 |
| 2018/0115170 A1 * | 4/2018 | Bacarella | | H02J 7/0021 |
| 2018/0133537 A1 * | 5/2018 | Montantes | | A63B 21/072 |
| 2018/0224915 A1 | 8/2018 | Shuster et al. | | |
| 2018/0342930 A1 * | 11/2018 | Roberts | | H02K 7/1861 |
| 2018/0351390 A1 * | 12/2018 | Venkatraman | | H02J 7/025 |
| 2019/0163142 A1 * | 5/2019 | Chang | | G04G 9/0064 |
| 2019/0204928 A1 * | 7/2019 | Takenaka | | G06F 3/01 |
| 2019/0393715 A1 * | 12/2019 | Yamakawa | | G04G 19/00 |
| 2020/0026244 A1 * | 1/2020 | Guhl | | A61B 5/681 |
| 2020/0142361 A1 * | 5/2020 | Franzi | | G04G 19/02 |
| 2021/0149345 A1 * | 5/2021 | Szulewski | | G04G 21/02 |
| 2021/0235568 A1 * | 7/2021 | Rattray | | H04W 4/023 |
| 2022/0363092 A1 * | 11/2022 | Copeland | | G04B 99/00 |
| | | | | 368/66 |

FOREIGN PATENT DOCUMENTS

| | | |
|---|---|---|
| CN | 201130304 Y | 10/2008 |
| CN | 101482731 A | 7/2009 |
| CN | 102540864 A | 7/2012 |
| CN | 202522857 U | 11/2012 |
| CN | 204759037 U | 11/2015 |
| CN | 204903957 U | 12/2015 |
| CN | 205427462 U | 8/2016 |
| CN | 106483835 A | 3/2017 |
| CN | 107145210 A | 9/2017 |
| CN | 101162382 A | 4/2018 |
| JP | 55-67682 A | 5/1980 |
| JP | 2010-243461 A | 10/2010 |
| JP | 2015-175602 A | 10/2015 |
| JP | 2017-161551 A | 9/2017 |
| JP | 2018-100981 A | 6/2018 |

OTHER PUBLICATIONS

Indian Office Action dated Jun. 29, 2020 in Indian Patent Application No. 201944043768 (with English translation), 5 pages.

European Search Report dated Apr. 9, 2019 in European Application 18204123.6, filed on Nov. 2, 2018 (with English Translation of Categories of Cited Documents).

Office Action dated Oct. 27, 2020 in corresponding Japanese Patent Application No. 2019-187360 (with English Translation), 7 pages.

Office Action dated Dec. 16, 2020 in corresponding Korean Patent Application No. 10-2019-0138031 (with English Translation), 11 pages.

Combined Chinese Office Action and Search Report dated Feb. 8, 2022 in corresponding Chinese Patent Application No. 201911015614.6 (with English Translation and English Translation of Category of Cited Documents), 9 pages.

* cited by examiner

METHOD FOR MANAGING THE ELECTRICAL CONSUMPTION OF A WATCH

CROSS-REFERENCE TO RELATED APPLICATION

This application claims priority to European Patent Application No. 18204123.6 filed on Nov. 2, 2018, the entire disclosure of which is hereby incorporated herein by reference.

FIELD OF THE INVENTION

The present invention concerns a method for managing the electrical consumption of a watch.

The invention also concerns a watch implementing this method together with a computer programme.

PRIOR ART

In the state of the art, watches conventionally use primary or secondary batteries as a source of energy. Such energy sources generally have a limited life and must thus periodically be changed or charged by a charging device external to the watch.

To overcome this drawback, there are watches known in the state of the art that comprise charging devices which are capable of transforming the mechanical energy produced into electrical energy that can be used to power the watch. These watch charging devices each entail actuation of a bezel connected to an electricity generation mechanism of the device in order to charge the accumulator of the watch.

However, a major drawback of these watches is related to the fact that the wearer is often obliged to charge the watch accumulator when the watch stops working.

It is understood that there is therefore a need to find an alternative solution, particularly one which does not have the drawbacks of the prior art.

SUMMARY OF THE INVENTION

It is therefore an object of the present invention to propose a method for managing the electrical consumption of a watch allowing the wearer of the watch optimum control of this consumption management.

It is another object of the invention to allow the wearer to streamline and optimise the mechanical force that he uses to charge the watch.

With this aim, the invention relates to a method for managing the electrical consumption of a watch including a step of identifying a need to charge a watch accumulator, and a step of charging said accumulator through guided actuation of a control member of an electrical energy generation mechanism of the watch, if a need to recharge is identified.

In other embodiments:
the charging step includes a sub-step of visual and/or audio guidance in the actuation of the control member of the electrical energy generation mechanism;
the guidance sub-step includes an information generation phase for guiding the control member;
said information includes a distance of displacement and/or a time required for actuation of the control member of the energy generation mechanism to meet the identified need;
the guidance sub-step includes a phase of diffusion of said generated information to the wearer of the watch by means of the visual guide elements and/or the sound interface of this watch;
the identification step includes a sub-step of periodically determining the accumulator charge level;
the identification step includes a sub-step:
of evaluating the electrical consumption of a function performed by the watch, or
evaluating the electrical consumption of a function to be performed by the watch;
the determination sub-step and the evaluation sub-steps include a phase of transmitting an audio and/or visual message to the wearer of the watch (1) prompting him to charge the accumulator.

The invention also concerns a watch, especially a connected watch, implementing this method.

The invention also concerns a computer programme comprising programme code instructions for the execution of the steps of this method when said computer programme is executed by a watch processing unit.

BRIEF DESCRIPTION OF THE DRAWINGS

Other features and advantages will appear clearly from the following description, given by way of non-limiting illustration, with reference to the annexed Figures, in which.

DETAILED DESCRIPTION OF THE INVENTION

Figure 1:
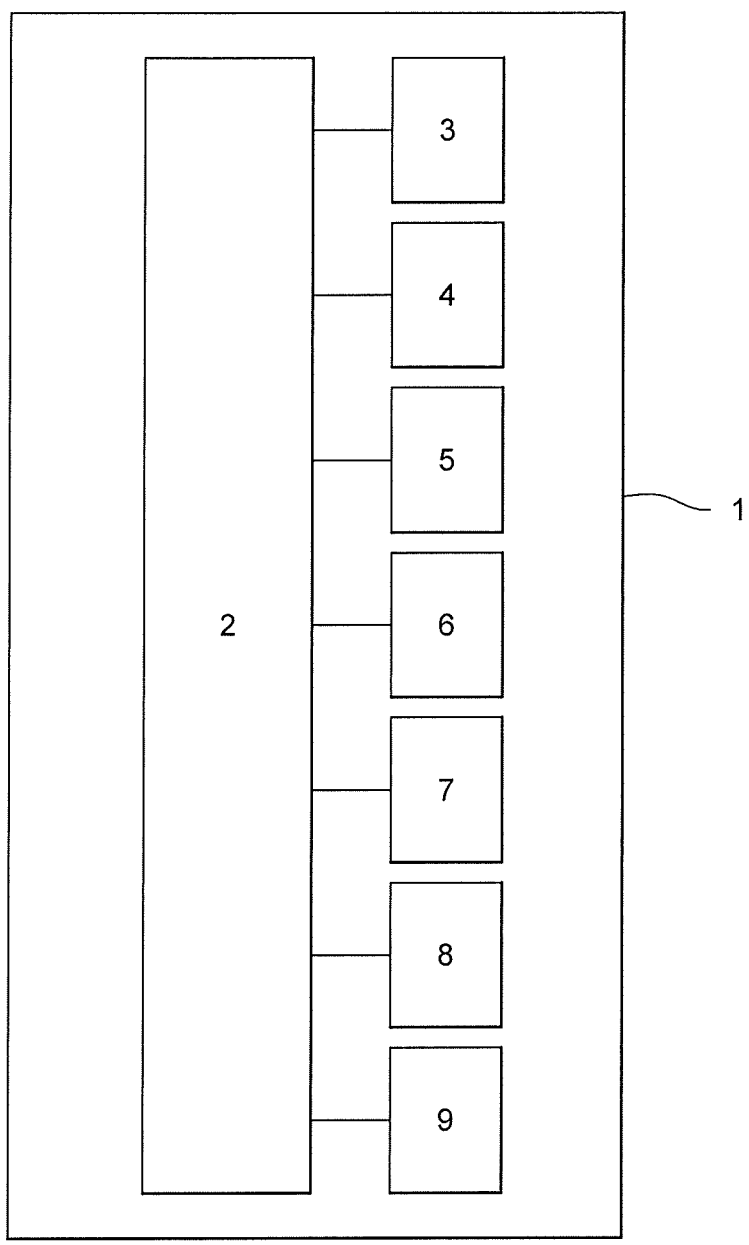
FIG. 1 represents a logic diagram concerning a method for managing the electrical consumption a watch, according to one embodiment of the invention.
Figure 2:
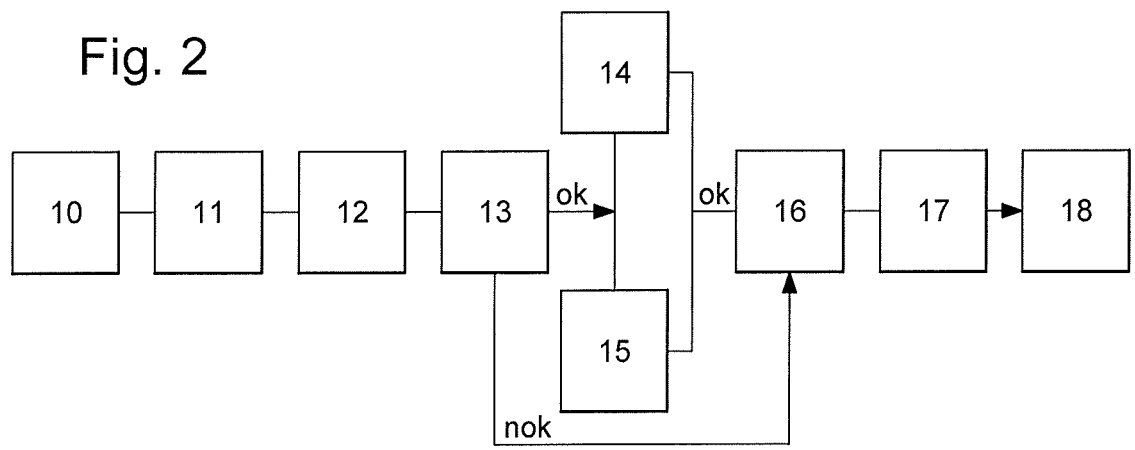
FIG. 2 represents a watch implementing this method, according to the embodiment of the invention.

FIG. 1 illustrates a method for managing the electrical consumption of a watch. This method aims to achieve optimum management of the electrical consumption of the watch by prompting the wearer of the watch to actuate, under guidance, a control member 5 of an electrical energy generation mechanism 4 of this watch.

This method is implemented by a watch 1, notably a connected mechanical watch comprising a mechanical movement. Such a watch 1 includes, in a non-exhaustive and non-limiting manner:
a processing unit 2 including material and software resources, in particular, at least one processor cooperating with memory elements;
an accumulator 3;
an energy generation mechanism 4 including an electrical generator in kinematic connection with at least one control member 5 and connected to accumulator 3;
a hybrid display dial 6 provided with a first analogue display component and a second digital and/or alphanumeric display component;
a sound interface 7 such as a loudspeaker;
a communication module 8;
at least one control member 5 of energy generation mechanism 4, such as a bezel or a rotating crown, and visual guide elements 9.

This processing unit 2 of watch 1 is connected, amongst other things, to sound interface 7, to an accumulator 3, to display dial 6, to energy generation mechanism 4, to said at least one control member 5, to communication module 8 and to visual guide elements 9.

In this watch 1, communication module 8 is capable of establishing a connection to a cellular network system comprising, in particular, a SIM (Subscriber Identity Module) or to a wireless local area network (WLAN), and is also capable of implementing communication technologies such as, for example, Bluetooth. In these conditions, watch 1 is capable of exchanging data with a remote server, a computer or a smartphone.

Such a method includes a step 10 of identifying a need to charge an accumulator 3 of watch 1. During this step 10, this need to charge accumulator 3 of watch 1 is identified when processing unit 2 detects a drop in charge of accumulator 3 resulting, for example, from the execution of a function of watch 1, or when this unit determines that a function of watch 1 will be executed or has been executed.

In this context, it will be noted that the functions of watch 1 may preferably be those which use more electrical energy in comparison to the low energy consuming time and/or date display functions. These functions concern for example:

- recovery of data, such as daily weather forecasts, which involves the use, in particular, of communication module 8;
- use of a barometer of watch 1;
- use of an altimeter of watch 1;
- use of a navigation system;
- use of a compass;
- use of a 'Tracking and POI' system;
- use of a system to assess a number of steps;
- use of a system to assess caloric energy expenditure,
- use of a system to assess a distance travelled.
- an alarm;
- a chronometer;
- a timer; and
- etc. . . .

This step 10 then includes a sub-step 11 of periodically determining the charge level of accumulator 3. To achieve so, this sub-step 11 includes a step 12 of measuring the charge level of accumulator 3 of watch 1. Once this measurement has been made, sub-step 11 provides a phase 13 of comparing this charge level measurement to a reference threshold. If the measurement is less than the reference threshold, then accumulator 3 needs to be charged. Indeed, in this context, the charge level of accumulator 3 of watch 1 does not allow the functions of watch 1 to be executed properly and/or sufficiently. In this context, this sub-step 11 provides a phase 16 of transmitting an audio and/or visual message to the wearer of watch 1 prompting him to charge accumulator 3. This message is generated by processing unit 2 and transmitted to the wearer via display dial 6, particularly the second component of dial 6, and/or by sound interface 7.

Conversely, if this measurement is greater than the reference threshold, need identification step 10 then provides for the implementation of a sub-step:

- of evaluating 14 the electrical consumption of a function performed by watch 1, or
- of evaluating 15 the electrical consumption of a function to be performed by watch 1.

During sub-step 15 of evaluating the electrical consumption of the function performed by watch 1, when processing unit 2 detects the end of execution of a function, this unit 2 then determines the electrical consumption resulting from execution of this function. More specifically, when processing unit 2 detects the start of execution of the function, it simultaneously or quasi simultaneously makes a measurement of the state of charge of accumulator 3. Subsequently, at the end of execution of the function, processing unit 2 makes another measurement of the state of charge of accumulator 3 and thus determines the electrical consumption relating to execution of this function. From the determination of this consumption, processing unit 2 is capable of quantifying the need to charge accumulator 3 in order to offset the electrical energy consumed during implementation of this function. In this context, this sub-step 15 then provides a phase 16 of transmitting an audio and/or visual message to the wearer of watch 1 prompting him to charge accumulator 3. This message is generated by processing unit 2 and transmitted to the wearer via display dial 6, particularly the second component of the dial, and/or by sound interface 7.

During sub-step 18 of evaluating the electrical consumption of the function to be performed by watch 1, when processing unit 2 detects future performance of a function, for example when an alarm is programmed, or the initial start of a function, unit 2 then evaluates the potential electrical consumption which will be caused by performance of this function. This evaluation is performed by processing unit 2, notably on the basis of statistical data about the usual use of this function by the wearer. From the determination of this consumption, processing unit 2 is capable of quantifying the requisite need to charge accumulator 3 necessary for performance of this function in order to offset the electrical energy which will be used. In this context, this sub-step 18 provides a phase 16 of transmitting an audio and/or visual message to the wearer of watch 1 prompting him to charge accumulator 3. This message is generated by processing unit 2 and transmitted to the wearer via display dial 6, particularly the second component of the dial, and/or by sound interface 7. This message may be transmitted to the wearer, for example subsequent to programming the execution of the function (for example setting the alarm) or as soon as the function starts.

It will be noted in the context of this method that, on receiving the message prompting him/her to charge accumulator 3 of watch 1, the wearer has the possibility of refusing this prompt, postponing it to a later date or immediately carrying it out.

Insofar as the wearer accepts to perform the charging operation, particularly via his watch 1, the method then provides a step 17 of charging accumulator 3 through guided actuation of a control member 5 of an electrical energy generation mechanism 4 of watch 1. This energy generation mechanism 4 is capable of transforming the mechanical energy produced by activating control member 5 into electrical energy. This step 17 includes a sub-step 18 of visual and/or audio guidance in the actuation of control member 5 of electrical energy generation mechanism 4. This sub-step 18 includes a phase 19 of generating information for guiding control member 5. Subsequently, guidance sub-step 18 includes a phase 20 of diffusing said information generated to the wearer of watch 1 via visual guide elements 9 and/or sound interface 7 of watch 1. This information is produced from the quantification of the identified need to charge. This information includes, in particular, the distance of displacement and/or time required for actuation of control member 5 of energy generation mechanism 4 to meet the identified need. It will be noted that visual guide elements 9 are defined in the watch to enable the wearer visually to identify and quantify the displacement of the control member. These guide elements 9 can thus be arranged in the dial, the case middle, the bezel or be generated in the second dial display component.

In a first example, transparent/translucent dial appliques can be illuminated separately from each other by light sources arranged behind the dial in order to indicate to the wearer the distance of displacement over which a control member 5, such as the bezel of watch 1, should be actuated. These appliques can, for example, be illuminated between a starting point located at 12 o'clock and a finish point at 6 o'clock for a displacement of the bezel in the clockwise direction of watch 1. In this configuration, the bezel can thus include a reference point, which may or may not be illuminated, positioned at the starting point, which is 12 o'clock here. Sub-step 18 may provide a phase of detecting the position of the bezel reference point in order to align the starting point with the reference point.

In a second example, the illuminated appliques may correspond to the time required for actuation of control member 5, which may be the bezel or crown here, by the wearer. In this configuration, sub-step 18 may include constant or periodic measurements of the state of charge of accumulator 3 during the entire actuation of control member 5 in order to update the required charging time accordingly.

In a third example similar to the first or the second example, the visual indication provided by the illuminated appliques are replaced by an audible indication via sound interface 7 of watch 1.

The invention also concerns a computer programme including programme code instructions for the execution of steps 10 to 18 of this method when said computer programme is executed by a processing unit 2 of watch 1.

The invention claimed is:

1. A method for managing electrical consumption of a watch, the method comprising:
   determining, by processing circuitry, a need to charge an accumulator of the watch by measuring a charge level of the accumulator; and
   calculating an amount to charge the accumulator based on the measured charge level;
   charging said accumulator through guided movement, by a user of the watch, of a control member in kinematic connection to an electrical generator of an electrical energy generation mechanism of the watch, when the need to recharge is determined,
   wherein the control member is a bezel or a crown, arranged on an external portion of the watch and movable by the user relative to a body of the watch, and
   the charging step further comprises, only in response to the processing circuitry determining the need to charge, providing visual guidance via a digital display and/or providing audio guidance to the user indicating to the user a distance of movement and/or a time of movement of the control member relative to the body of the watch that is needed to be performed by the user in order to charge the accumulator the calculated amount.

2. The method according to claim 1, wherein the step of providing the visual guidance comprises generating digital information instructing the user to move the control member.

3. The method according to claim 2, wherein the step of generating the information further comprises generating said information, which includes the distance of movement and/or the time of movement, which are required for movement of the control member to meet the determined need to charge the accumulator.

4. The method according to claim 3, wherein the step of providing the visual guidance further comprises providing said generated information to the user of the watch with visual guide elements of said watch.

5. The method according to claim 1, wherein the determining step further comprises periodically measuring a charge level of the accumulator.

6. The method according to claim 1, wherein the determining step further comprises:
   evaluating the electrical consumption of a first function performed by the watch, or
   evaluating the electrical consumption of a second function to he performed by the watch in the future.

7. The method according to claim 6, wherein the determining step further comprises periodically measuring the charge level of the accumulator and transmitting an audio message and/or a visual message to the user of the watch prompting the user to charge the accumulator.

8. The watch comprising circuitry configured to implement the method according to claim 1.

9. A non-transitory computer-readable medium storing a computer program comprising program code instructions for the execution of the steps of the method according to claim 1, when said computer program is executed by processing circuitry of the watch.

10. The method of claim 1, wherein the control member is the bezel of the watch, and the charging step further comprising providing the visual guidance, which instructs the user regarding a particular distance to rotate the bezel.

11. The method of claim 10, further comprising activating light sources arranged behind a dial of the watch to provide the visual guidance of the particular distance, which is a rotational angle through which the bezel is to be rotated.

12. The method of claim 1, wherein the charging step further comprises displaying, on the digital display, a digital message indicating the distance of movement.

13. The method of claim 1, wherein the charging step further comprises displaying, on the digital display, a digital message indicating the time of movement.

14. The method of claim 1, wherein the determining step further comprises comparing, by the processing circuitry, the measured charge level to a predetermined threshold to determine the need to charge.

15. The method of claim 1, wherein the determining step further comprises measuring the charge level in response to detecting a start of a function to be performed by the watch, and again measuring the charge level in response to detecting an end of performance of the function by the watch.

16. The method of claim 1, wherein the determining step further comprises determining the need to charge the accumulator by determining electrical consumption of a function to be performed by the watch in the future.

* * * * *